H. W. ANGSTEN.
WHEEL CONSTRUCTION.
APPLICATION FILED MAY 6, 1920.
1,433,522. Patented Oct. 31, 1922.
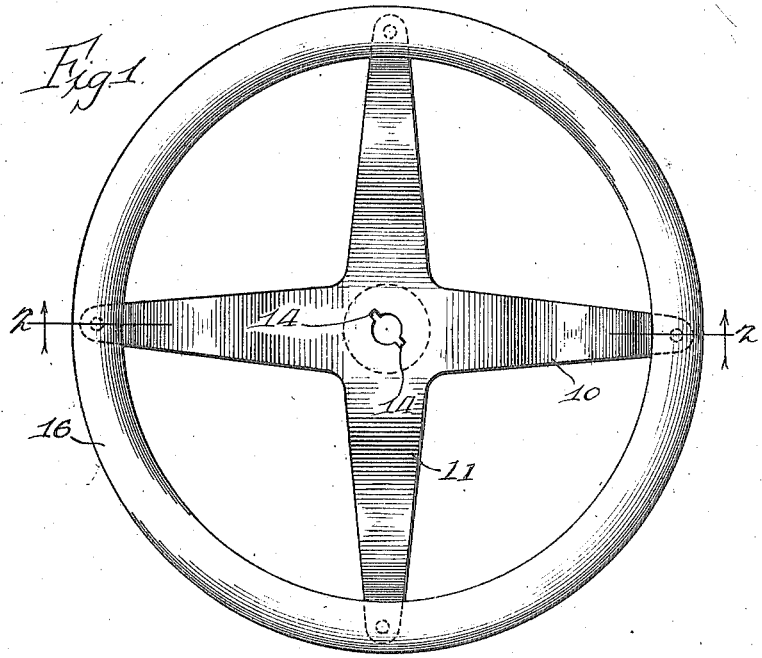
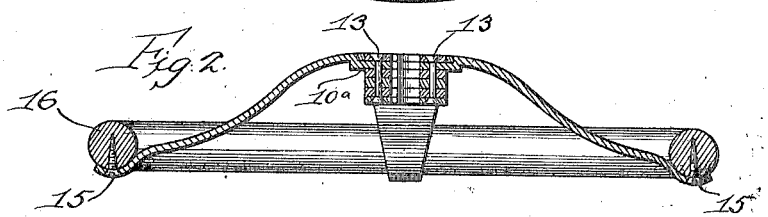
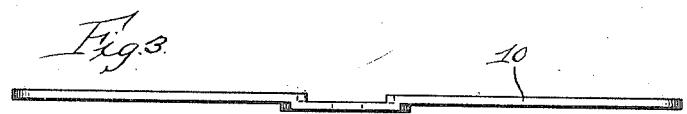
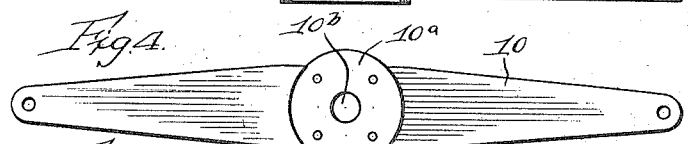
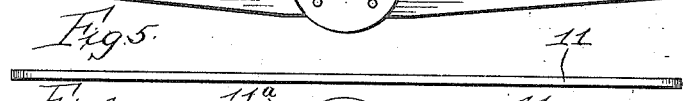
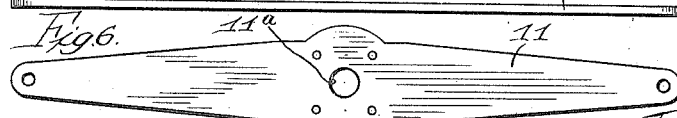

Patented Oct. 31, 1922.

1,433,522

UNITED STATES PATENT OFFICE.

HENRY W. ANGSTEN, OF CHICAGO, ILLINOIS.

WHEEL CONSTRUCTION.

Application filed May 6, 1920. Serial No. 379,226.

*To all whom it may concern:*

Be it known that I, HENRY W. ANGSTEN, a citizen of the United States, residing at Chicago, in the county of Cook and State of Illinois, have invented certain new and useful Improvements in Wheel Constructions, of which the following is a specification.

The invention relates to an improved construction for wheels and is applicable to wheels for steering columns of motor vehicles.

It is a further object of the invention to provide an improved wheel construction having spokes and a hub portion from which said spokes radiate to the usual rim, said spokes and hub portions being integrally formed to insure greater strength and economy of manufacture.

Other objects of the invention will appear from the following description which is directed to the preferred embodiment of the invention, also illustrated in the drawings forming a part of the specification.

Fig. 1 is a plan view showing the invention applied to the construction of a steering wheel for automobiles.

Fig. 2 is a sectional view on line 2—2 of Fig. 1 illustrating details of construction of the wheel and the manner of its assembly.

Figs. 3 to 7 inclusive are detail views of the component parts of the hub and spoke portions of the wheel of Figs. 1 and 2.

In the form of the invention as embodied in the steering wheel type of wheel of Figs. 1 to 7 inclusive, it is the intention to build the wheel of suitable sheet metal or forgings of a tough quality of metal, preferably of steel, and the reference characters 10 and 11 indicate generally such forgings or members. The members 10 and 11 are adapted to be arranged in the form of a Greek cross and in order that they may be joined together to form the spider of the wheel they are given a special formation at or near the centers of each in order to form the hub portion of the wheel spider. This construction will be apparent from an inspection of Figs. 3 and 4 illustrating the member 10 and from which it will be seen that this member is widest at the central portion where it is approximately in the form of a circle $10^a$ having a central perforation $10^b$. The circular portion $10^a$ is formed integrally with the member 10, but is offset out of the plane of the body portion thereof approximately the thickness of the member 11 in order to allow for the thickness of the member 11 when arranged in the depression to form the spider in the form of the aforesaid Greek cross. The member 11 is likewise centrally perforated at $11^b$ and surrounding this perforation there is also a circular member $11^a$ similar in shape to the circular portion $10^a$ but not offset out of the plane of the member 11. After the forgings 10 and 11 are completed in the rough they will be assembled in the manner indicated and in order to form a suitable hub portion there will be added a plurality of perforated metallic washers circular in form, as indicated by reference character 12, the manner of assembling being illustrated in Fig. 2. The members 10, 11 and 12 will all be perforated in order to take suitable rivets, as indicated at 13, for securing the parts together, and in addition to this riveting it is preferred that any joints or cracks resulting after the parts are joined together in the manner indicated be filled with solder so that after polishing the wheel spider will present the appearance of an integral structure and will take any desired formation in order to form a suitably polished and ornamented steering wheel. After the member 10 and 11 and the hub portions are joined together in the manner indicated the central openings $10^b$ and $11^b$ of the spider and $12^b$ in the washer may be reamed or smoothed out by a suitable tool and the opposite key ways and slots 14 cut by the use of a suitable tool in order to anchor the steering wheel on the top of the steering post or shaft. The spider either before or after being assembled may be put under a suitable forming tool in order to give the radial spokes thereof any desired shape, as that illustrated in Fig. 2, the outer ends being given a suitable curve to receive and have anchored thereto by screws 15 a suitable circular grip portion, as indicated by reference character 16, formed preferably of wood or other suitable material adapted to be conveniently grasped by the hands of the operator.

It is well known that the weakest part of a wheel for agricultural tools and other purposes such as the steering wheel of a motor vehicle is to be found in the joining between the spokes and the hub in such wheels of ordinary construction. By my improved method of forming the spokes of the wheel in pairs integral with each other and radiating through the hub of the wheel I form a wheel of exceptional strength and one which is not liable to breakage or failure even when subjected to heavy loads or strains.

The present practice is to cast the spider of a steering wheel with the result that such castings are much heavier than a built up wheel of the character herein described formed of steel forgings or stamped metal and a considerable saving in weight of material is accomplished by constructing a wheel according to my invention.

I claim:

1. A wheel comprising a circumferential rim portion and an integral spider having radiating spokes secured to said circumferential rim portion, said spider comprising a plurality of integral intersecting strips, said strips extending from one point in the circumferential rim through the center of the wheel and to a point 180 degrees removed from the first said point at the opposite side of the circumferential rim, means for securing said strips together, and a plurality of plates secured to the said spider adjacent the intersection of the said strips therein to form a hub portion for said wheel.

2. A wheel comprising a circumferential rim portion and an integral spider having radiating spokes secured to said circumferential rim portion, said spider comprising a plurality of integral intersecting strips, said strips extending from one point in the circumferential rim through the center of the wheel and to a point 180 degrees removed from the first said point at the opposite side of the circumferential rim, means for securing said strips together, a plurality of plates secured to the said spider adjacent the intersection of the said strips therein to form a hub portion for said wheel, and means for securing said plates together and to said spider.

3. A wheel comprising a circumferential rim portion, and a central spider comprising a pair of integral metal strips arranged in the form of a Greek cross being attached together at their points of intersection by riveting, and having their extremities joined to said circumferential rim portion, one of said strips being offset at the central or hub portion thereof to furnish a seat or housing for the reception of the co-operating strip of the spider, whereby the extensions or spokes formed by said strips will lie in substantially a common plane, there being a reinforcing hub portion attached to said spider adjacent the intersection of said strips comprising a plurality of metallic plates riveted to said spider, said plates and said strips being perforated to form a shaft or axle bearing for said wheel.

4. A wheel comprising a circumferential rim, and an interior spider consisting of a plurality of integral strips of metal having their extremities joined to said circumferential rim, and being formed each near their middle part with a substantially circular portion, the said circular portions overlying each other and being riveted together, one of said circular portions being formed out of the plane of the body part of its strip to furnish a seat for the circular portion of the other strip, and a plurality of metallic plates adapted to form a hub portion at the intersection of said strips forming the interior spider, said plates and said strips being riveted and soldered together.

In testimony whereof I have signed my name to this specification on this 16th day of April A. D. 1920.

HENRY W. ANGSTEN.